UNITED STATES PATENT OFFICE.

ALBRECHT HEIL, OF FRANKFORT-ON-THE-MAIN, GERMANY, ASSIGNOR OF ONE-HALF TO CONRAD HUBERT AND ONE-HALF TO SAMUEL STERN, BOTH OF NEW YORK, N. Y.

GALVANIC CELL.

1,195,677.      Specification of Letters Patent.      Patented Aug. 22, 1916.

No Drawing.      Application filed December 24, 1913. Serial No. 808,586.

*To all whom it may concern:*

Be it known that I, ALBRECHT HEIL, a subject of the Emperor of Germany, residing at Frankfort-on-the-Main, Germany, have invented a certain new and useful Improvement in Galvanic Cells, of which the following is a specification.

My invention relates to galvanic cells and particularly to the depolarizing electrodes of such cells, and consists in adding, to a depolarizing mass containing manganic hydrate or hydrate of manganese dioxid, an oxid of a metal which is far removed from zinc toward the negative end of the electrochemical series. Such an oxid can be formed, for example, from bismuth, silver or mercury, and should be intimately mixed with graphite and with the manganic hydrate or hydrate of manganese dioxid or both.

For the electrolyte, a caustic potash or caustic soda is preferably used and zinc is used as the other pole of the cell. It has been found that in caustic solutions the specified hydrates give no higher voltage than they do in the ordinary solution of ammonium chlorid, but, nevertheless, because of their exceptionally fine sub-division and their peculiar character as hydrates, they are notably very readily reducible.

With mercuric oxid and the deep black hydrate of manganese dioxid (heretofore referred to in Patent No. 1,053,505, granted to me February 18, 1913,) in the proportion of fifty-five parts by weight of mercuric oxid to thirty-five parts by weight of the deep black hydrate of manganese dioxid, and in an alkaline electrolyte consisting of one hundred parts by weight of caustic alkali and one hundred parts by weight of water a constant voltage is obtained for a long period and, for example in a flash light battery, a very much greater efficiency is attained, particularly during the middle and final periods of discharge.

I claim:

1. A galvanic cell comprising positive and negative elements, and a depolarizing mass composed of an intimate mixture of a hydrate of manganese, an oxid of a metal far removed from zinc toward the negative end of the electro-chemical series and carbon.

2. A galvanic cell comprising positive and negative elements, and a depolarizing mass composed of an intimate mixture of a hydrate of manganese, mercuric oxid and carbon.

3. A galvanic cell comprising positive and negative elements, and a depolarizing mass composed of an intimate mixture of deep black hydrate of manganese dioxid, an oxid of a metal far removed from zinc toward the negative end of the electro-chemical series and carbon.

4. A galvanic cell comprising positive and negative elements, and a depolarizing mass composed of an intimate mixture of deep black hydrate of manganese dioxid, mercuric oxid and carbon.

5. A galvanic cell comprising positive and negative elements, a depolarizing mass composed of an intimate mixture of a hydrate of manganese, an oxid of a metal far removed from zinc toward the negative end of the electro-chemical series and carbon, and an alkaline electrolyte.

6. A galvanic cell comprising positive and negative elements, a depolarizing mass composed of an intimate mixture of a hydrate of manganese, mercuric oxid and carbon, and an alkaline electrolyte.

7. A galvanic cell comprising positive and negative elements, a depolarizing mass composed of an intimate mixture of deep black hydrate of manganese dioxid, an oxid of a metal far removed from zinc toward the negative end of the electro-chemical series and carbon, and an alkaline electrolyte.

8. A galvanic cell comprising positive and negative elements, a depolarizing mass composed of an intimate mixture of deep black hydrate of manganese dioxid, mercuric oxid and carbon, and an alkaline electrolyte.

9. A galvanic cell comprising a positive zinc element, a negative carbon element, and a depolarizing mass for the negative carbon element comprising deep black hydrate of manganese dioxid, mercuric oxid and carbon, and an alkaline electrolyte.

In testimony whereof I have affixed my signature in presence of two witnesses.

ALBRECHT HEIL.

Witnesses:
    JEAN GRUND,
    CARL GRUND.